United States Patent
Pollica et al.

(10) Patent No.: US 10,103,395 B2
(45) Date of Patent: Oct. 16, 2018

(54) DISTRIBUTED HYDROGEN EXTRACTION SYSTEM

(71) Applicant: Nuvera Fuel Cells, LLC, Billerica, MA (US)

(72) Inventors: Darryl Pollica, Melrose, MA (US); Scott Blanchet, Chelmsford, MA (US); Zhijiang Li, Franklin, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 15/353,818

(22) Filed: Nov. 17, 2016

(65) Prior Publication Data

US 2017/0069921 A1   Mar. 9, 2017

Related U.S. Application Data

(62) Division of application No. 13/946,537, filed on Jul. 19, 2013, now Pat. No. 9,531,024.

(Continued)

(51) Int. Cl.
*H01M 8/04082* (2016.01)
*G06Q 30/02* (2012.01)
(Continued)

(52) U.S. Cl.
CPC ...... *H01M 8/04201* (2013.01); *B01D 53/047* (2013.01); *B01D 53/0462* (2013.01);
(Continued)

(58) Field of Classification Search
CPC ........... H01M 8/04201; H01M 8/0675; H01M 8/0681; B01D 53/0462; B01D 53/229;
(Continued)

(56) References Cited

U.S. PATENT DOCUMENTS 3,406,496 A   10/1968   Betteridge et al.
6,361,896 B1 *  3/2002   Eberle .................. B01D 53/326
                                                         204/196.38
(Continued)

FOREIGN PATENT DOCUMENTS

JP   2001-502105 A   2/2001
JP   2002-020102 A   1/2002
(Continued)

OTHER PUBLICATIONS

PCT International Search Report issued in International Patent Application No. PCT/US2013/051286, dated Oct. 7, 2013 (12 pages).

(Continued)

*Primary Examiner* — Helen Oi K Conley
(74) *Attorney, Agent, or Firm* — Finnegan, Henderson, Farabow, Garrett & Dunner, LLP

(57) ABSTRACT

A hydrogen extraction system is provided. The extraction system can comprise a compressor for compressing a gas mixture comprising hydrogen and a desulfurization unit for receiving the compressed gas mixture. The system can also comprise a hydrogen-extraction device for receiving a reduced-sulfur gas mixture and a hydrogen storage device for receiving an extracted hydrogen gas. A method of extracting hydrogen from a gas mixture comprising natural gas and hydrogen, and a method of determining an energy price are also provided.

12 Claims, 7 Drawing Sheets

Related U.S. Application Data

(60) Provisional application No. 61/675,041, filed on Jul. 24, 2012.

(51) Int. Cl.

| | | |
|---|---|---|
| *H01M 8/0662* | (2016.01) | |
| *B01D 53/04* | (2006.01) | |
| *B01D 53/047* | (2006.01) | |
| *B01D 53/22* | (2006.01) | |
| *C01B 3/50* | (2006.01) | |
| *C10L 3/10* | (2006.01) | |
| *B01D 53/32* | (2006.01) | |
| *G06Q 50/06* | (2012.01) | |

(52) U.S. Cl.
CPC ......... *B01D 53/229* (2013.01); *B01D 53/326* (2013.01); *C01B 3/50* (2013.01); *C10L 3/101* (2013.01); *C10L 3/102* (2013.01); *G06Q 30/0283* (2013.01); *G06Q 50/06* (2013.01); *H01M 8/0675* (2013.01); *H01M 8/0681* (2013.01); *B01D 2256/16* (2013.01); *B01D 2257/30* (2013.01); *C01B 2203/042* (2013.01); *C01B 2203/043* (2013.01); *C01B 2203/0405* (2013.01); *C01B 2203/048* (2013.01); *C01B 2203/066* (2013.01); *Y02E 60/324* (2013.01); *Y02E 60/50* (2013.01)

(58) Field of Classification Search
CPC .... B01D 53/326; B01D 2256/16; C01B 3/50; G06Q 30/0283; G06Q 50/06; C10L 3/101; C10L 3/102
See application file for complete search history.

(56) References Cited

U.S. PATENT DOCUMENTS

| | | |
|---|---|---|
| 2004/0049982 A1 | 3/2004 | Shimizu et al. |
| 2004/0112427 A1 | 6/2004 | Klassen |
| 2004/0131901 A1 | 7/2004 | Yamashita et al. |
| 2006/0037244 A1 | 2/2006 | Clawson |
| 2006/0137245 A1 | 6/2006 | Kenefake et al. |
| 2010/0279181 A1* | 11/2010 | Adams, II ............ B01D 53/265 429/410 |
| 2010/0322845 A1* | 12/2010 | De Souza ............ B01D 53/047 423/648.1 |
| 2011/0200897 A1 | 8/2011 | McAlister |

FOREIGN PATENT DOCUMENTS

| | | |
|---|---|---|
| JP | 2002-212575 A | 7/2002 |
| JP | 2003-095612 A | 4/2003 |
| JP | 2004-079262 A | 3/2004 |
| JP | 2004-534186 A | 11/2004 |
| JP | 2006-169357 A | 6/2006 |
| JP | 2008-247702 A | 10/2008 |
| JP | 2010-500272 A | 1/2010 |
| WO | WO 02/103833 A1 | 12/2002 |

OTHER PUBLICATIONS

AFPM Industry 101, "Petroleum Coke: Petroleum Coke Overview," Copyright © 2016—AFPM; http://education.afpm.org/refining/petroleum-coke/ ; 10 pages.
Decision of Rejection in China Patent Application No. 201380049444.8 dated Jul. 21, 2017.
Examination Report issued by European Patent Office for EP Application No. 13745513.5, dated Jan. 3, 2018 (7 pages).
Office Action issued by Japanese Patent Office for JP Application No. 2015-524335, dated Mar. 30, 2017 (10 pages).
Second Office Action issued by Chinese Patent Office for CN Application No. 201380049444.8, dated Dec. 14, 2016 (11 pages).
First Office Action issued by Chinese Patent Office for CN Application No. 201380049444.8, dated Jan. 26, 2016 (15 pages).
Reference D3, cited by Chinese Patent Office in First Office Action issued for CN Application No. 201380049444.8, dated Jan. 26, 2016 (4 pages).
Decision to Grant Patent issued by Japanese Patent Office for JP Application No. 2015-524335, dated Nov. 16, 2017 (6 pages).
English Translation of Claims Allowed in Decision to Grant Patent issued by Japanese Patent Office for JP Application No. 2015-524335, dated Nov. 16, 2017 (3 pages).
Japanese Pat. No. 6263178, based on JP Application No. 2015-524335, published in the Japanese Official Patent Gazette dated Jan. 17, 2018 (12 pages).

* cited by examiner

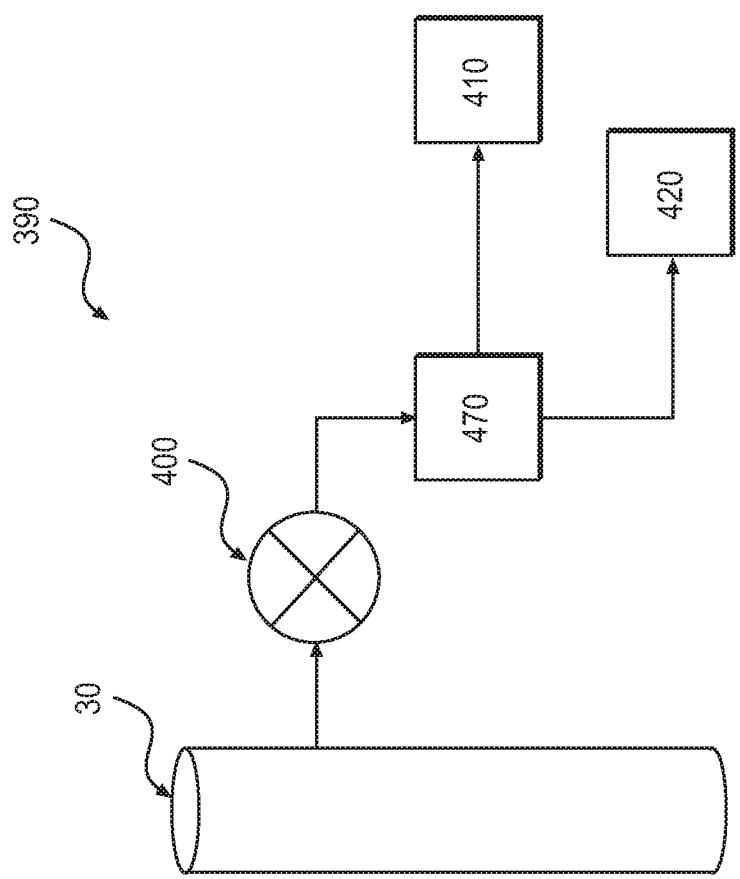

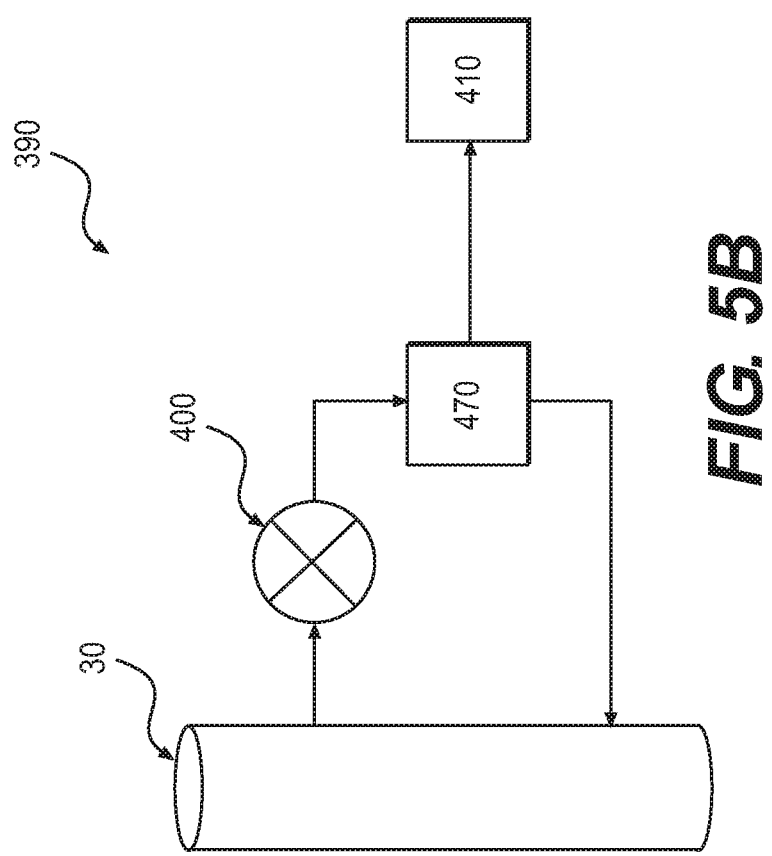

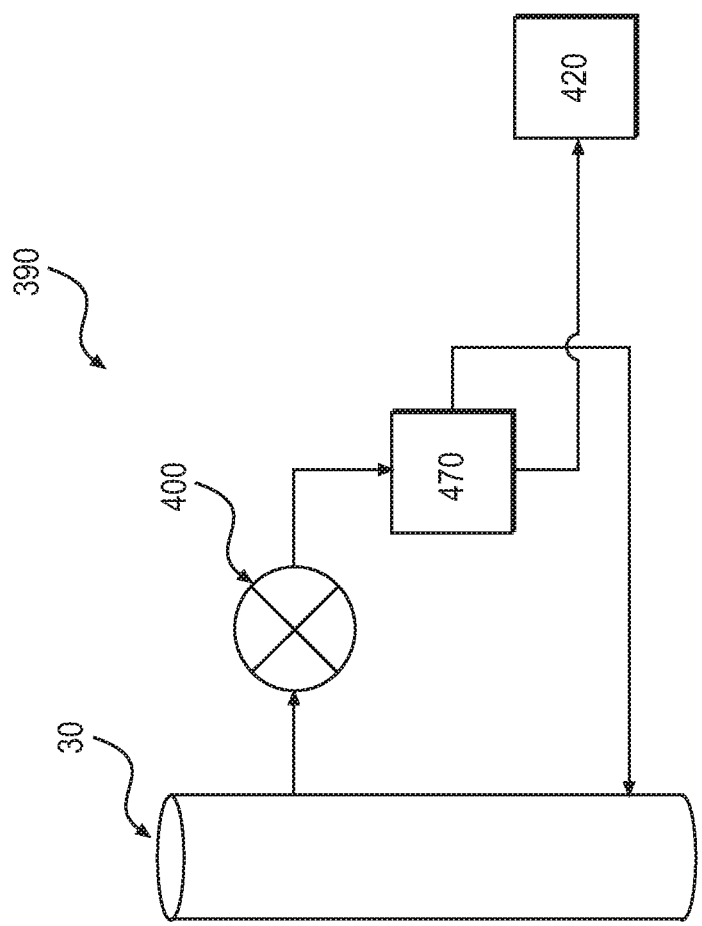

DISTRIBUTED HYDROGEN EXTRACTION SYSTEM

This application is a divisional of U.S. patent application Ser. No. 13/946,537, filed Jul. 19, 2013, which claims priority to U.S. Provisional Application No. 61/675,041, filed Jul. 24, 2012, which are both incorporated herein by reference in their entirety.

This disclosure is generally directed to a system for distributed hydrogen extraction.

Some energy sources are currently distributed by networks, while other energy sources are delivered in bulk and stored on-site. For example, electrical and some gas networks use power lines and pipelines to supply energy to residential households and commercial operations. Whereas oil and some other gases are delivered by truck to on-site storage facilities. However, changing regulations, environmental considerations, and economic factors will affect future distribution of energy sources.

Hydrogen gas is typically distributed using tankers and stored in large tanks on-site or at specific distribution centers. Another hydrogen distribution system could use an existing gas network, where hydrogen is added to a transport gas for distribution via the existing network. Extraction systems coupled to the network could extract hydrogen from the transport gas as required, reducing transportation and storage costs.

One proposed method of hydrogen distribution uses a natural gas (NG) or a synthetic NG (SNG) network. Up to 50% hydrogen can be added to an NG network without significantly affecting typical consumers of NG. Some proposals include adding about 10% to about 20% hydrogen to existing NG networks. Hydrogen can be produced, either renewably or from fossil fuels, and added to an existing NG network where it can be distributed to a number of consumers. Multiple hydrogen extraction systems could be coupled to the existing network and configured to extract hydrogen as required.

Current hydrogen generation systems are not suitable for use with the network described above for several reasons. Most current hydrogen generation systems are configured for industrial-scale operation and are not suitable for small-scale use. They can be large, expensive, complex to operate, or require extensive maintenance.

The present disclosure is directed to overcoming one or more of the disadvantages of existing hydrogen generation systems. Moreover, hydrogen produced by the extraction systems described herein can be stored on site, supplied to a dedicated hydrogen distribution system, or used on site. For example, the extracted hydrogen could be supplied to a fuel cell and used to produce electricity.

Other aspects of the present disclosure are directed to monitoring and pricing hydrogen gas usage. For example, as hydrogen gas will likely have a greater value than NG, monitoring hydrogen gas consumption separately from NG consumption will more accurately account for the actual cost of gas consumed. This may also affect the monetization of blended fuel. The present disclosure describes systems and methods to monitor both hydrogen and NG consumption at the point of use.

One aspect of the present disclosure is directed to a hydrogen extraction system. The extraction system can comprise a compressor for compressing a gas mixture comprising hydrogen and a desulfurization unit for receiving the compressed gas mixture. The system can also comprise a hydrogen-extraction device for receiving a reduced-sulfur gas mixture and a hydrogen storage device for receiving an extracted hydrogen gas.

Another aspect of the present disclosure is directed to a method of extracting hydrogen from a gas mixture comprising natural gas and hydrogen. The method can comprise compressing the gas mixture and removing at least part of the sulfur contained in the compressed gas mixture to form a sulfur-rich stream and a reduced-sulfur mixture. The method can also comprise removing at least part of the hydrogen contained in the reduced-sulfur mixture to form a hydrogen-depleted mixture and a hydrogen gas and supplying the hydrogen gas to a hydrogen storage device or other use.

Another aspect of the present disclosure is directed to a method of determining an energy price. The method can comprise a) determining a mass flow rate of hydrogen gas and b) determining a mass flow rate of natural gas. The method can also comprise c) multiplying the mass flow rate of hydrogen gas by a factor for hydrogen gas, d) multiplying the mass flow rate of natural gas by a factor for natural gas, and e) adding the values of step c) and step d).

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the systems, devices, and methods, as claimed.

The accompanying drawings, which are incorporated in and constitute a part of this specification, illustrate several embodiments of the present disclosure and together with the description, serve to explain the principles of the present disclosure.

FIG. 5A is a schematic representation of a monitoring system, according to an exemplary embodiment.

FIG. 5B is a schematic representation of the monitoring system of FIG. 5A, according to another exemplary embodiment FIG. 5C is a schematic representation of the monitoring system of FIG. 5A, according to another exemplary embodiment.

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
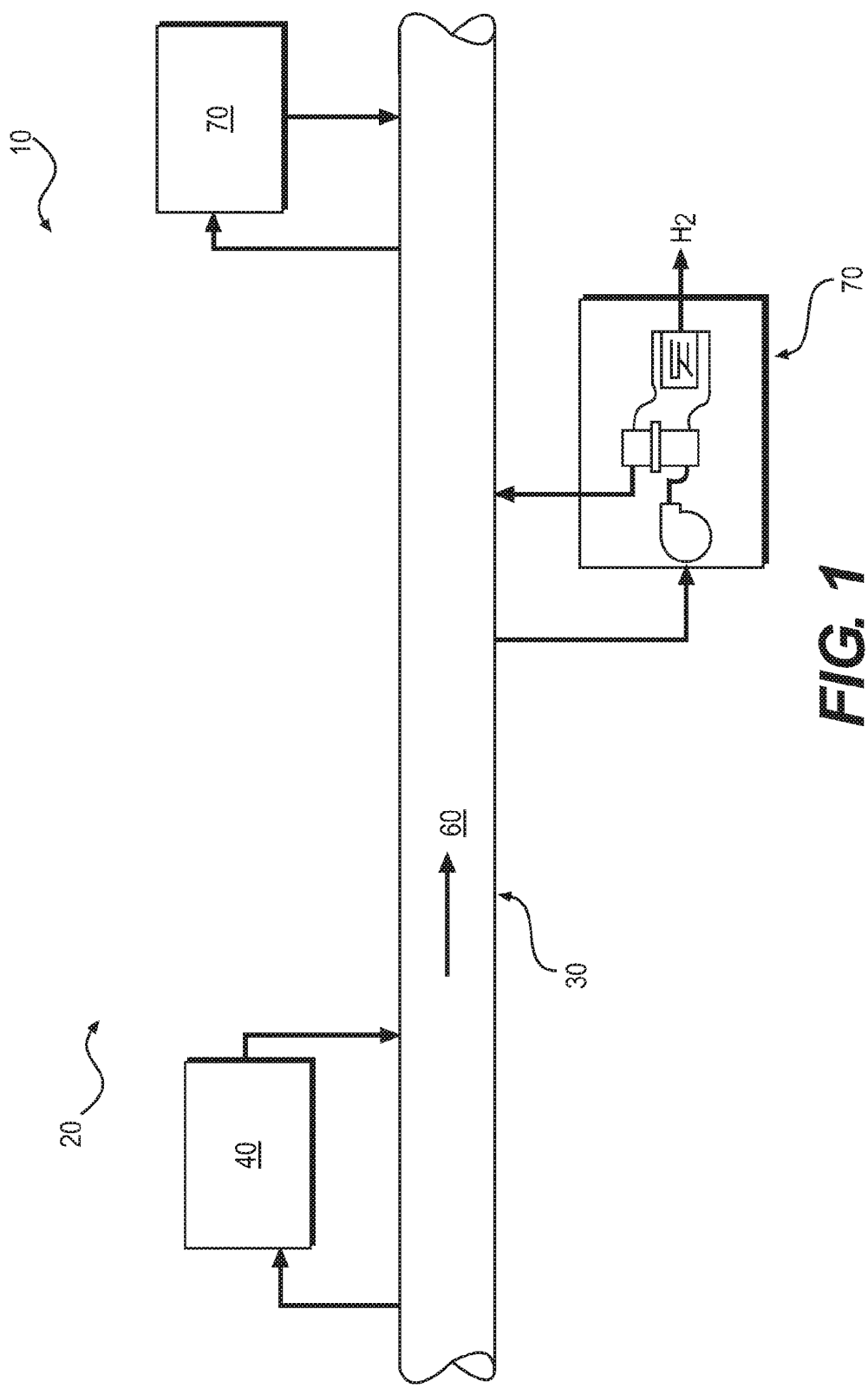
FIG. 1 is a schematic representation of a hydrogen distribution system, according to an exemplary embodiment.

FIG. 1 is a schematic representation of a hydrogen distribution system 10, according to an exemplary disclosed embodiment. Hydrogen distribution system 10 can comprise a network 20 for distribution of a fluid to various locations. Network 20 can be designed to transport a mixture of various liquids or gasses, or a single type of liquid or gas. For example, network 20 can comprise an existing gas distribution system.

Various pipelines, conduits, passageways, and other fluid transportation devices and systems can form at least part of network 20. Network 20 can also comprise various devices (not shown) designed for fluid handling. These devices can comprise storage facilities, pumping stations, valves, filters, meters, control systems, monitoring systems, or other equipment used in conjunction with fluid or gas transfer.

In some embodiments, network 20 can comprise a natural gas distribution system that supplies natural gas (NG) to residential or commercial sites. NG can include a mixture of several gas species. Network 20 can comprise a pipeline 30 configured to receive various fluids, including NG. In addition, a hydrogen source 40 can be fluidly connected to pipeline 30 to supply network 20 with hydrogen.

Hydrogen source 40 can comprise a steam reformer (not shown) or other device configured to produce hydrogen. The steam reformer could be supplied with electricity, water, and NG from pipeline 30. Electricity could be supplied by conventional or alternate energy sources, such as, wind or solar energy. The steam reformer may comprise a large reformer (e.g., >2000 kg/day), injecting hydrogen into a high flow or a high pressure pipeline at centralized nodes. Some industrial reformers may produce up to about 600 tonnes of hydrogen each day. In other embodiments, the steam reformer may comprise a small reformer (e.g., <5 kg/day) located at a user's home. Other steam reformers at any scale between large and small may also be used.

Other sources of hydrogen could comprise systems or methods used to generate hydrogen via electrolysis of water using electricity, renewably electricity (wind, solar, geothermal), non-renewable electricity (coal, oil, gas, nuclear), biological production, water splitting by direct solar catalysis, or wastewater treatment.

Multiple hydrogen sources 40 could be located throughout network 20 and configured to supply hydrogen to pipeline 30 where needed. In some embodiments, a gas mixture 60 within pipeline 30 can be greater than 80% NG and less than 20% hydrogen. Gas mixture 60 can also comprise less than 5% hydrogen and less than 10% hydrogen. Gas mixture 60 could, in some instances, contain up to 75% hydrogen. It is also contemplated that network 20 may comprise a dedicated system for distribution of gas mixture 60 having about 100% hydrogen. In addition, one or more hydrogen extraction systems 70 may be coupled to network 20.

Figure 2:
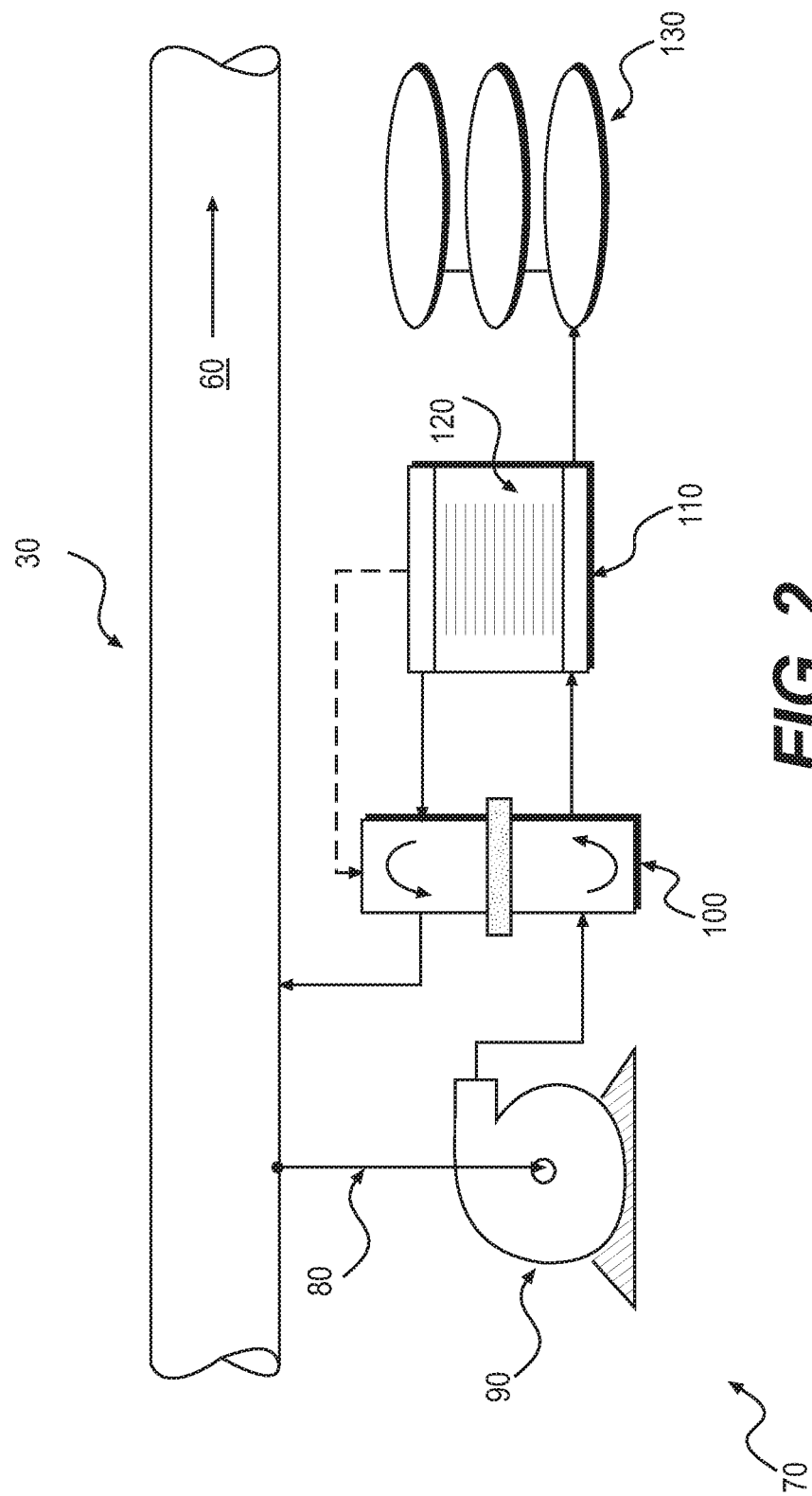
FIG. 2 is a schematic representation of a hydrogen extraction system, according to an exemplary embodiment.

FIG. 2 is a schematic representation of hydrogen extraction system (HES) 70, according to an exemplary disclosed embodiment. HES 70 may be configured to extract hydrogen from gas mixture 60. In some embodiments, HES 70 may comprise cost-effective system for the separation, purification, and/or compression of hydrogen gas. Given a relatively small number of components, HES 70 may be configured to occupy a small volume and/or a small footprint. As such, HES 70 could be used in residential or small-scale commercial applications.

For example, HES 70 could be configured to supply hydrogen at about 0.5 kg/day for one fuel cell electric vehicle (FCEV) or about 1 kg/day for two FCEVs. Hydrogen gas may then be compressed to a pressure of between about 350 to about 700 bara, as may be required for on-board storage in a FCEV. HES 70 could be sized to provide hydrogen at a rate required for a fleet of more than two FCEVs. In other examples, HES 70 could be configured to supply to a fuel cell for stationary electricity production, such as about 4 kg/day (e.g., residence), about 25 kg/day (e.g., apartment complex), about 50 kg/day (e.g., industrial building), or about 250 kg/day (e.g., large manufacturing or distribution center), or about 1,500 to about 2,500 kg/day (e.g., fuel cell car refueling at service stations).

HES 70 can be fluidly coupled to pipeline 30 via a supply conduit 80. As explained below with regard to FIGS. 5A-5C, supply conduit 80 can comprise a meter (400, but not shown in FIG. 2) to monitor a flow of gas mixture 60 from pipeline 30 to HES 70. Supply conduit 80 can be fluidly coupled to a compressor 90 configured to compress a fluid. Compressor 90 can include a pump, a blower, or another compression device suitable for operation with natural gas. In some embodiments, compressor 90 may only pump a fluid and may not need to compress the fluid. In particular, compressor 90 can be configured to pump a fluid mixture through at least part of HES 70. If HES 70 comprises a low pressure drop, compressor 90 could operate as a blower.

Output from compressor 90 can be directed into a desulfurization unit 100 configured to remove at least some sulfur from the fluid supplied to desulfurization unit 100. Various types desulfurization unit 100 may operate with HES 70. For example, desulfurization unit 100 can comprise a regenerative thermal swing adsorption (TSA) type. The TSA may be configured so that the sulfur removed from the stream leaving desulfurization unit 100 can be added back into a stream returning to pipeline 30. Such a configuration may require little or no maintenance, such as, for example, replacement of a desulfurization catalyst.

In some embodiments, HES 70 may not include compressor 90. For example, gas mixture 60 may be supplied to desulfurization unit 100 directly from pipeline 30 at sufficient pressure. In particular, gas mixture 60 could be supplied at about 100 to about 1,000 psig. At such pressures, or higher, gas mixture 60 may require no additional pressurization before being directed into desulfurization unit 100.

Following at least partial removal of sulfur from the fluid by desulfurization unit 100, a supply of reduced-sulfur gas mixture output by desulfurization unit 100 can be directed to a hydrogen extraction unit 110 to extract hydrogen. Extracted hydrogen gas output by hydrogen extraction unit 110 can be stored in one or more storage vessels 130.

In some embodiments, hydrogen extraction unit 110 can comprise an electrochemical stack (EHC) 120, or similar device, configured to separate, purify, and/or compress hydrogen. EHC 120 may be configured to provide a simpler and more cost-effective system than some other forms of extraction unit 110. For example, EHC 120 may have no moving parts or less components than other forms of extraction unit 110. In addition, EHC 120 may have lower noise or a smaller footprint than a pressure-swing absorber system.

In some embodiments, heat output by EHC 120 can be supplied to desulfurization unit 100 or another component of hydrogen extraction system 70. This heat can be used to drive a thermal regeneration process for a TSA-based desulfurization unit 100 described above.

The reduced-hydrogen fluid mixture output by hydrogen extraction unit 110 can be supplied back to desulfurization unit 100. Within desulfurization unit 100, the reduced-hydrogen fluid mixture can be recombined with the sulfur extracted by desulfurization unit 100. The resulting fluid can be feed back into pipeline 30 or used at the site if desired.

Figure 3:
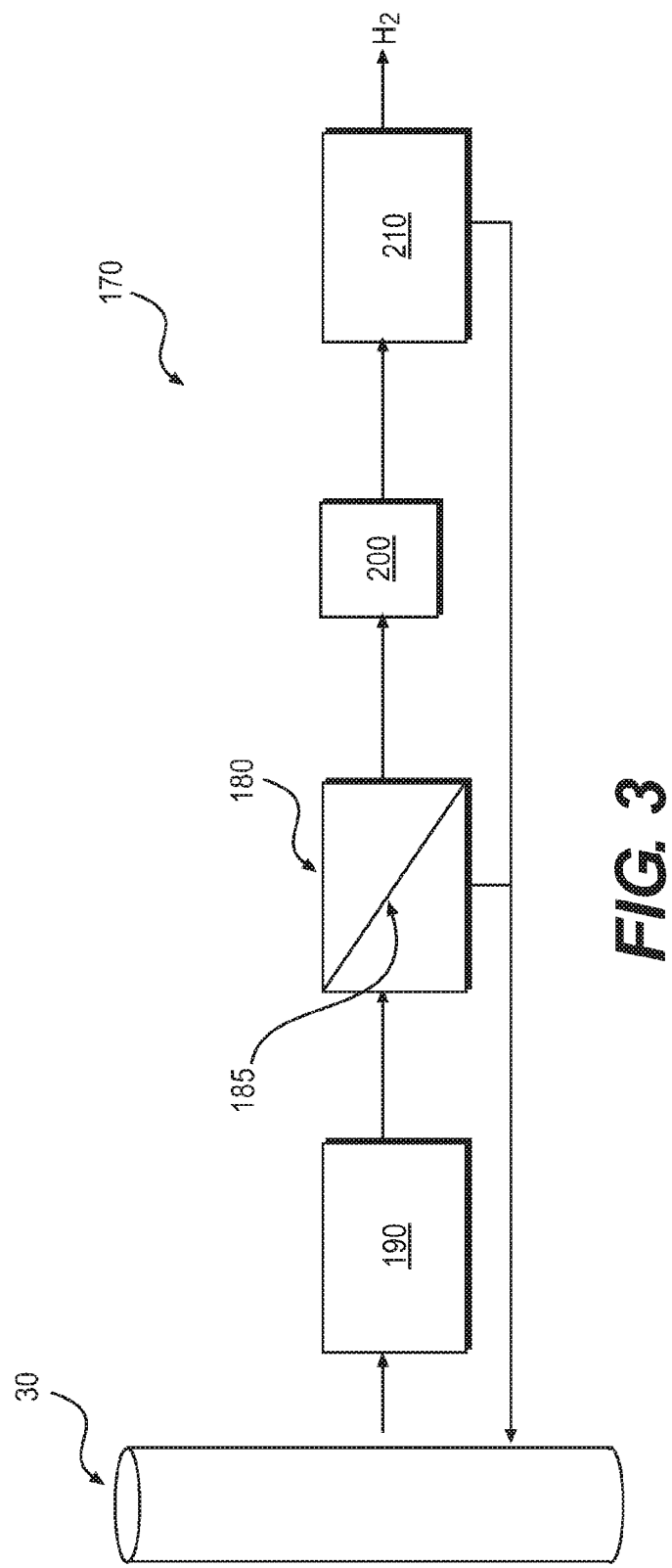
FIG. 3 is a schematic representation of another hydrogen extraction system, according to another exemplary embodiment.

FIG. 3 is a schematic representation of another hydrogen extraction system (HES) 170, according to another exemplary disclosed embodiment. Similar to the embodiment described above, HES 170 can comprise a compressor 190 and a desulfurization unit 200. For example, hydrogen-enriched natural gas can be compressed by compressor 190 and supplied to a selective membrane device 180. Selective membrane device 180 can be selective for hydrogen, and may be used to increase hydrogen concentration of a fluid to greater than 50% by volume.

Selective membrane device 180 can be used to separate hydrogen based on the difference in hydrogen partial pressure between a feed side and a permeate side. Selective membrane device 180 can comprise a membrane 185, wherein membrane 185 can comprise a dense polymer membrane of various forms, including hollow fiber bundle, spiral wound, or flat sheets. Such membranes are commercially available from specialized supplies, such as Air Products, BOC, or Air Liquide. Selective membrane device 180 can also comprise an inorganic hydrogen selective membrane.

Fluid output from selective membrane device 180 can be supplied to desulfurization unit 200 as described above. In other embodiments, HES 170 lacks desulfurization unit 200. Output from selective membrane device 180 can be supplied directly to a pressure swing absorption (PSA) device 210.

PSA 210 can be used to further purify the permeate stream from selective membrane device 180 to increase hydrogen purity to greater than 90%, greater than 95%, or greater than 99%. PSA 210 can employ multiple absorption beds and piping networks to connect the beds. The absorbent (not shown) can be in bead form or a structured form. Rotary valve, rotary beds, rapid-cycle PSA, or other devices known in the art may also be used.

Figure 4:
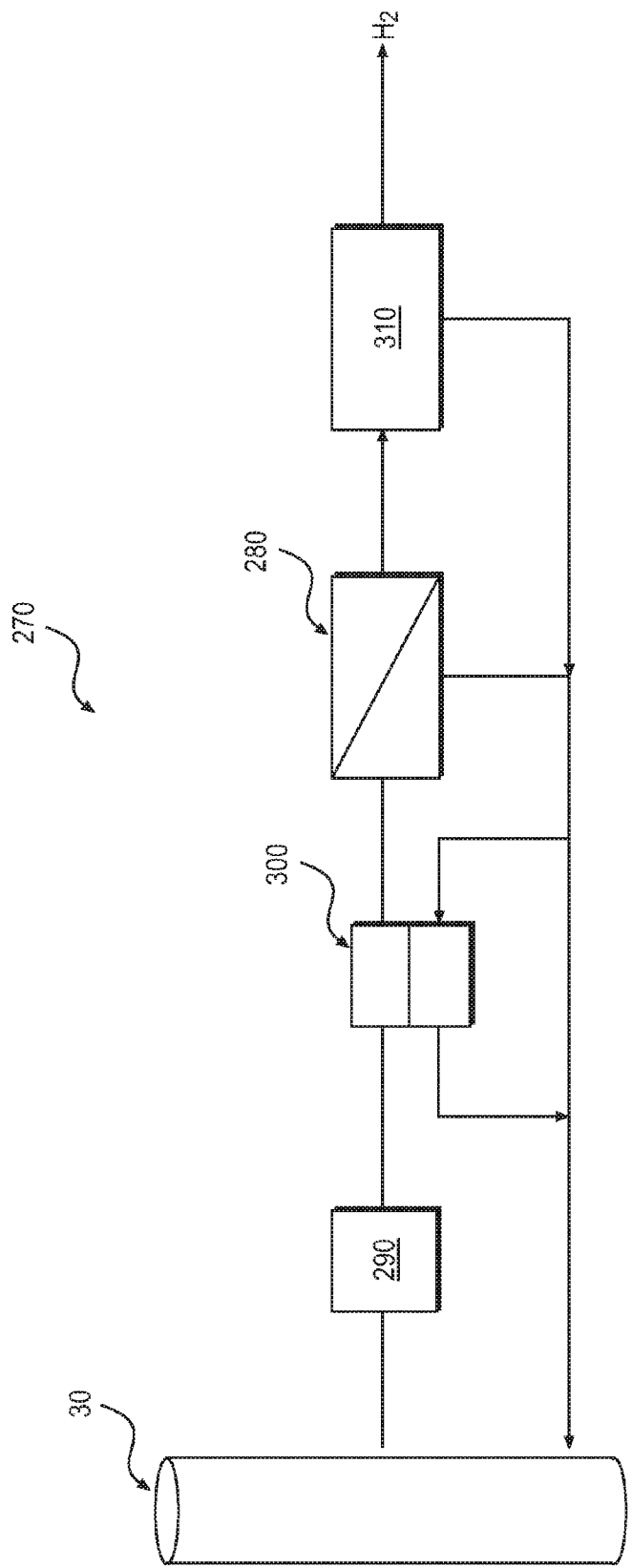
FIG. 4 is a schematic representation of the hydrogen extraction system of FIG. 3, according to another exemplary embodiment.

FIG. 4 is a schematic representation of another hydrogen extraction system (HES) 270, according to another exemplary disclosed embodiment. Similar to the embodiments described above, HES 270 can comprise a compressor 290 and a desulfurization unit 300. Hydrogen-enriched fluid can be compressed by compressor 290 and supplied to desulfurization unit 300.

Desulfurization unit 300 can comprise a multi-bed desulfurizer configured to at least partially remove sulfur-species from the gas mixture stream before the gas mixture is fed into a selective membrane device 280. Some beds within desulfurization unit 300 can be operated in an adsorption mode and other beds can be operated in a regeneration mode. Desorbed sulfur-species can be carried back to pipeline 30 using a fraction of returning gas output from selective membrane device 280 and/or a pressure swing absorption (PSA) device 310 similar to described above. As shown in FIG. 4, fluid output from selective membrane device 280 can be supplied to PSA 310. In other embodiments, various components of HES 70, 170, 270 can be differently configured to receive fluid from or supply fluid to other components.

FIG. 5A-C show various configurations of a monitoring system 390, according to some exemplary embodiments. Monitoring system 390 can be configured to monitor a flow of hydrogen gas mixture. Various electronic components (not shown) can be associated with system 390, such as, for example, a processor, memory, communication systems, etc. Monitoring system 390 can also comprise a meter 400 fluidly coupled to pipeline 30 and configured to receive a supply of gas mixture from pipeline 30. Meter 400 can also be coupled to a hydrogen extraction system (HES) 470.

While meter 400 is shown in FIGS. 5A-C, various other devices or methods can be used to determine flow rate. For example, meter 400 could comprise a traditional flow meter or a totalizer. In other embodiments, one or more components of HES 470 could be used to monitor a flow rate of one or more gases input or output from HES 470.

As explained above, hydrogen extracted from HES 470 could be stored on site, or used to supply hydrogen to a fuel cell 410 or a hydrogen distribution network (not shown). Hydrogen-depleted natural gas output from HES 470 could be supplied to a natural gas (NG) unit 420. NG unit 420 could comprise various residential or commercial devices configured to operate with NG, such as, for example, a heat source. In some embodiments, hydrogen or NG output from HES 470 can be returned to pipeline 30. In other embodiments, EHC 120 could be used to determine hydrogen flow.

Hydrogen will likely be more valuable than the NG used to transport it. Consequently, a user would prefer being charged based on how much hydrogen or NG they consume rather than paying for the entire gas mixture if they only consume part of it. Different prices for energy consumption can be determined based on a user's consumption of either NG or hydrogen.

FIG. 5A shows a scenario where a consumer extracts both NG and hydrogen gas from a gas mixture supplied by pipeline 30. For example, NG can be supplied to NG unit 420 and hydrogen gas can be supplied to fuel cell 410. A monetary value can be determined based on analyzing various fluid flows, such as, input and output flows. The calculations listed below can also be modified to include various permutations of one or more flows.

The price charged to the consumer for the scenario shown in FIG. 5A can be the sum of two or more calculations, or an equivalent determination. For example, each calculation can be proportional to the energy consumed times the market value for that energy form. The following equation (Equation 1) can be used to determine an energy price:

$$\text{Energy Price} = V_{H_2} \times \dot{m}_{H_2} + V_{NG} \times (cfm - \dot{m}_{H_2})$$

wherein, $V_{H_2}$ represents a market value factor for hydrogen gas, $\dot{m}_{H_2}$ represents a mass flow rate of hydrogen gas, $V_{NG}$ represents a market value factor for NG, and cfm represents a total mass flow reading from meter 400.

FIG. 5B shows a scenario where a consumer extracts only hydrogen gas from a gas mixture supplied by pipeline 30 and returns all the NG to pipeline 30. As explained above, the price charged to the consumer can be the sum of two or more calculations. The first calculation can be proportional to the energy consumed times the market value of the hydrogen. The second calculation can be proportional to the energy value depletion due to the return of NG to pipeline 30. The following equation (Equation 2) can be used to determine an energy price:

$$\text{Energy Price} = V_{H_2} \times \dot{m}_{H_2} + F_{depletion} \times (cfm - \dot{m}_{H_2})$$

wherein, $F_{depletion}$ represents a factor to account for the value depleted from the NG network by the consumer's extraction of hydrogen gas and the other variables are as described above for Equation 1.

FIG. 5C shows a scenario where a consumer extracts only NG from a gas mixture supplied by pipeline 30 and returns all the hydrogen gas to pipeline 30. The price charged to the consumer can be the difference between two calculations. The first calculation can be proportional to the energy consumed times the market value for NG. The second calculation can be proportional to the energy value addition due to the return of the hydrogen gas to pipeline 30. The following equation (Equation 3) can be used to determine an energy price:

$$\text{Energy Price} = V_{H_2} \times (cfm - \dot{m}_{H_2}) - F_{addition} \times \dot{m}_{H_2}$$

wherein, $F_{addition}$ represents a factor to account for the value added to the NG network by the consumer's return of hydrogen gas and the other variables are as described above for Equation 1.

Other embodiments of the present disclosure will be apparent to those skilled in the art from consideration of the specification and practice of the concepts disclosed herein. For example, another type of gas or fluid, other than NG, may be used with the above disclosure. Moreover, one or more functions or components of above systems may be combined into a single unit. Further, different equations or algorithms may be used that use different parameters to those described above, but use similar concepts or principles. It is intended that the specification and examples be considered as exemplary only, with a true scope and spirit of the present disclosure being indicated by the following claims.

What is claimed is:

1. A method of extracting hydrogen from a gas mixture comprising natural gas and hydrogen, the method comprising:
    compressing the gas mixture to produce a compressed gas mixture;
    removing sulfur contained in the compressed gas mixture to form a sulfur-rich stream and a reduced-sulfur mixture;
    receiving the reduced-sulfur mixture at a hydrogen extraction unit directly from a desulfurization unit;
    removing at least part of the hydrogen contained in the reduced-sulfur mixture received directly from the desulfurization unit to form a hydrogen-depleted mixture and a hydrogen gas; and
    supplying the hydrogen gas to a hydrogen storage device.

2. The method of claim 1, further including:
    receiving the gas mixture from a network;
    mixing the hydrogen-depleted mixture with the sulfur-rich stream to form a resulfurized mixture; and
    supplying the resulfurized mixture to the network.

3. The method of claim 2, wherein the network comprises an existing natural gas network.

4. The method of claim 1, further including selectively passing the compressed gas mixture through a hydrogen selective membrane, which increases a hydrogen concentration of the compressed gas mixture.

5. The method of claim 4, wherein passing the compressed gas mixture through the hydrogen selective membrane increases the hydrogen concentration of the compressed gas mixture to greater than 50% by volume.

6. The method of claim 1, further including supplying the stored hydrogen gas to a fuel cell to produce electricity.

7. The method of claim 1, further including passing the reduced-sulfur mixture through a pressure swing adsorption device in order to remove at least part of the hydrogen contained in the reduced-sulfur mixture.

8. The method of claim 1, further including passing the reduced-sulfur mixture through an electrochemical stack in order to remove at least part of the hydrogen contained in the reduced-sulfur mixture.

9. The method of claim 8, wherein the electrochemical stack is configured to at least partially purify and compressed the hydrogen gas.

10. The method of claim 1, wherein the hydrogen gas supplied to the hydrogen storage device is at a purity of greater than about 90%.

11. The method of claim 1, further including extracting the natural gas from the gas mixture and an supplying the natural gas to a natural gas unit.

12. The method of claim 11, further including determining an energy price for the natural gas supplied to the natural gas unit and the hydrogen gas supplied to the hydrogen storage device.

* * * * *